United States Patent
Kluonaitis et al.

(10) Patent No.: US 12,287,837 B1
(45) Date of Patent: Apr. 29, 2025

(54) GENERATING A PATH TO A DOCUMENT ELEMENT USING MACHINE LEARNING

(71) Applicant: Oxylabs, UAB, Vilnius (LT)

(72) Inventors: Karolis Kluonaitis, Vilnius (LT); Martynas Juravicius, Vilnius (LT); Andrius Kuksta, Vilnius (LT)

(73) Assignee: Oxylabs, UAB, Vilnius (LT)

( * ) Notice: Subject to any disclaimer, the term of this patent is extended or adjusted under 35 U.S.C. 154(b) by 0 days.

(21) Appl. No.: 18/830,361

(22) Filed: Sep. 10, 2024

(51) Int. Cl.
*G06F 16/951* (2019.01)
*G06F 40/205* (2020.01)

(52) U.S. Cl.
CPC .......... *G06F 16/951* (2019.01); *G06F 40/205* (2020.01)

(58) Field of Classification Search
CPC .............................. G06F 16/951; G06F 40/205
USPC .......................................................... 707/709
See application file for complete search history.

(56) References Cited

U.S. PATENT DOCUMENTS

| | | | | |
|---|---|---|---|---|
| 5,864,863 A * | 1/1999 | Burrows | ................ | G06F 16/319 |
| 6,446,098 B1 * | 9/2002 | Iyer | ....................... | G06F 40/289 |
| | | | | 715/239 |
| 6,681,223 B1 * | 1/2004 | Sundaresan | ............. | G06F 16/84 |
| | | | | 707/999.005 |
| 7,730,396 B2 | 6/2010 | Chidlovskii et al. | | |
| 11,379,542 B1 * | 7/2022 | Juravicius | ............... | G06N 20/00 |
| 11,657,057 B2 * | 5/2023 | James | ................... | G06F 16/907 |
| | | | | 707/755 |
| 2005/0267871 A1 * | 12/2005 | Marchisio | ........... | G06F 16/3338 |
| 2016/0321252 A1 * | 11/2016 | Zhu | .......................... | G06F 16/94 |
| 2019/0279084 A1 | 9/2019 | Darachi, Jr. et al. | | |
| 2021/0182343 A1 * | 6/2021 | Li | .......................... | G06F 18/214 |
| 2024/0256582 A1 * | 8/2024 | Jain | ...................... | G06F 16/3329 |

(Continued)

FOREIGN PATENT DOCUMENTS

| | | | | |
|---|---|---|---|---|
| CN | 109344355 B | | 3/2022 | |
| WO | WO 01/18692 A2 * | 3/2001 | ............. | G06F 17/30 |
| WO | WO2024221562 A1 | | 10/2024 | |

OTHER PUBLICATIONS

Penman, Richard Baron, et al., "Web Scraping Made Simple with SiteScraper", Penman Web Scraping, © 2009, CiteSeer, pp. 1-10.*

(Continued)

*Primary Examiner* — Robert Stevens
(74) *Attorney, Agent, or Firm* — Sterne, Kessler, Goldstein & Fox, P.L.L.C.

(57) ABSTRACT

Disclosed herein are system, method, and computer program product embodiments for improving web scraping technology by using machine learning to generate parsing expressions. A system receives a request to identify an element in a first document at a target web page. The system downloads and modifies the first document by adding an index value as an attribute to a tag for the element. A query is submitted to a large language model (LLM), including the modified first document, a description of the element, and a request asking the LLM to identify the element based on the description. The system obtains, from the LLM, the index value assigned to the element. The system generates an expression defining a path to the element in the first document using the index returned by the large language model. The system downloads a second document, and parses data of a second element using the expression.

20 Claims, 6 Drawing Sheets

(56) References Cited

U.S. PATENT DOCUMENTS

2024/0281446 A1* 8/2024 Bathwal .............. G06F 16/9538
2024/0281472 A1* 8/2024 LaRhette .............. G06F 16/248

OTHER PUBLICATIONS

Hassan, Rehab F., et al., "Imroving the Web Indexing Quality through A Website-Search Engine Coactions", International Journal of Computer and Information Quality, vol. 3, Issue 2, Mar. 2014, pp. 285-291.*

Lu, Weizheng, et al., "Large Language Model for Table Processing: A Survey", arXiv, document No. arXiv:2402.05121v2, Cornell Univ., Jul. 26, 2024, pp. 1-26.*

Zhu, Yutao, et al., "Large Language Models for Information Retrieval: A Survey", arXiv, document No. arXiv:2308.07107v3, Cornell Univ., Jan. 19, 2024, pp. 1-33.*

* cited by examiner

GENERATING A PATH TO A DOCUMENT ELEMENT USING MACHINE LEARNING

BACKGROUND

Field

This field is generally related to using machine learning to generate parsing expressions.

Related Art

Web scraping (also known as screen scraping, data mining, web harvesting) is the automated gathering of data from the Internet. It is the practice of gathering data from the Internet through any means other than a human using a web browser. Web scraping is usually accomplished by executing a program that queries a web server and requests data automatically, then parses the data to extract the requested information.

To conduct web scraping, a program known as a web crawler may be used. A web crawler, sometimes called a web spider, is a program or an automated script which performs the first task, i.e. it navigates the web in an automated manner to retrieve data, such as Hypertext Transfer Markup Language (HTML) data, JSONs, XML, and binary files, of the accessed websites. Web scraping is useful for a variety of applications. In a first example, web scraping may be used for search engine optimization. In a second example, web scraping may be used to identify possible copyright. In a third example, web scraping may be useful to check placement of paid advertisements on a webpage. In a fourth example, web scraping may be useful to check prices or products listed on e-commerce websites.

A challenge faced by in web scraping is that web pages are often changed. For example, an e-commerce site may be updated to remove out of stock products, or add new products. Similarly, a webpage may be completely overhauled to include an updated layout. As a result, a parser may successfully parse data from a webpage on a first date, but may fail to parse data at a second data based on an updated layout of the webpage. Thus, there is a need to detect and respond to changes in web pages so that parsers are able to successfully parse data from web pages.

Web pages are often documents hosted by a server, accessible by a web browser. Web pages are often structured using a markup language such as HyperText Markup Language (HTML). For example, a webpage may include any number of HTML elements defining components of the webpage. The HTML within the web page may be structured according to a document object model (DOM). The DOM may be a tree structure used to logically organize components or sections of a web page. For example, an e-commerce website may include a main product section, and a related products section. Here, the DOM may include a root HTML element indicating the start of the web page. The DOM may further include two HTML elements, where one corresponds to the main product section and the other corresponds to the related products section. Each of these elements may further include nested HTML elements defining the section. For example, nested under the main product HTML element may be HTML elements defining the main product, buttons allowing the user to purchase the main product, etc. Similarly, nested under the related products section may be HTML elements defining other related products. Since the DOM is structured as a tree, a parser can access elements by traversing the nodes (e.g., HTML elements) of the tree.

Web pages may further include style data defining how elements within the markup language should appear. For example, a webpage may include cascade style sheet (CSS) data indicating how elements appear. Web pages may further include source code, such as JavaScript providing programmatic functionality to a page. For example, a webpage may include an HTML element for a button, CSS defining the color of the button, and JavaScript defining what happens when the button is clicked.

Systems and methods are needed for more efficient web scraping.

BRIEF SUMMARY

In an embodiment, a method provides an environment for using machine learning to generate a path to parse data from a document. In the method, a request is received. The request may identify an element sought to be parsed in a document accessible at a target web page. The document is downloaded from a uniform resource locator (URL) at the target web page. The document is modified by adding an index value as an attribute to a tag of the element. A query is submitted to a large language model (LLM) including the modified document, a description of the element to be parsed, and a request asking the LLM to identify the element. The LLM returns the index value corresponding to the element to be parsed. An expression is generated, where the expression defines a path to the element in the document that was assigned to the index value. A second document is downloaded from the URL at the target web page. Data is then parsed (e.g., extracted) from a second document from the target web server using the generated expression.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

DESCRIPTION OF THE DRAWINGS

The accompanying drawings are incorporated herein and form a part of the specification.

In the drawings, like reference numbers generally indicate identical or similar elements. Additionally, generally, the

DETAILED DESCRIPTION

Figure 1:
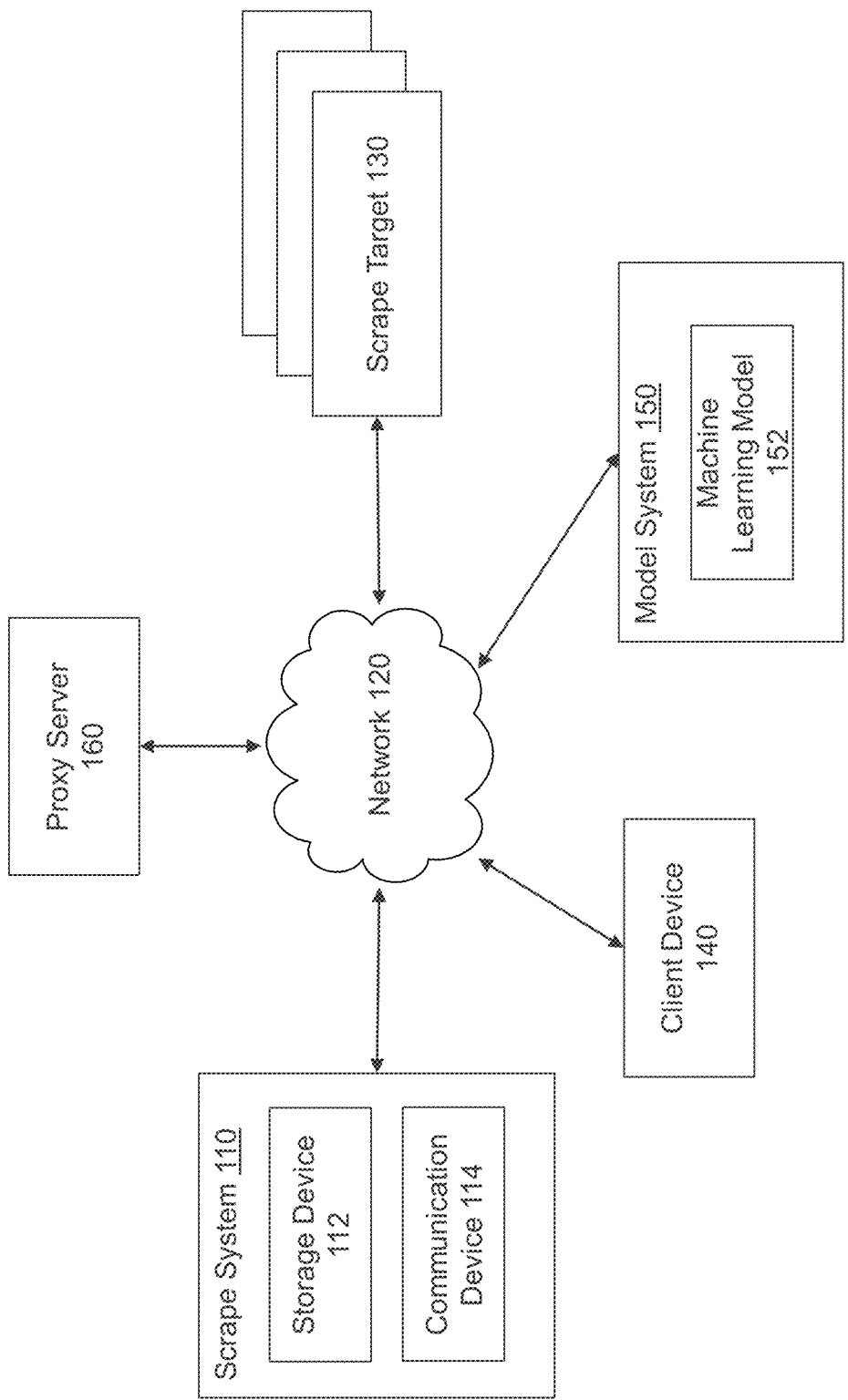
FIG. 1 is a block diagram illustrating various functional components of a scraping environment, according to some embodiments.

Provided herein are system, apparatus, device, method and/or computer program product embodiments, and/or combinations and sub-combinations thereof, for using machine learning to generate parsing expressions.

To conduct web scraping, the web request may be sent through a proxy server. The proxy server then makes the request on the web parser's behalf, collects the response from the web server, and forwards the web page data so that the parser can parse and interpret the page. When the proxy server forwards the requests, it generally does not alter the underlying content, but merely forwards it back to the web parser. A proxy server changes the request's source IP address, so the web server is not provided with the geographical location of the parser. Using the proxy server in this way can make the request appear more organic and thus ensure that the results from web scraping represent what would actually be presented were a human to make the request from that geographical location.

Proxy servers fall into various types depending on the IP address used to address a web server. A residential IP address is an address from the range specifically designated by the owning party, usually Internet service providers (ISPs), as assigned to private customers. Usually a residential proxy is an IP address linked to a physical device, for example, a mobile phone or desktop computer. However, businesswise, the blocks of residential IP addresses may be bought from the owning proxy service provider by another company directly, in bulk. Datacenter IPs are IPs owned by companies, not by individuals. The datacenter proxies are typically IP addresses that are not in a natural person's home.

Web scraping often requires knowledge of the layout or organization of content on a web page. A webpage may be built using a markup language (e.g., HTML), cascading style sheets (e.g., CSS), and source code (e.g., JavaScript). To parse content from the entity, the web parser may need to know where elements of interest are located within the HTML. Once the location of elements are known, scripts or expressions may be created that access the webpage, and retrieve the desired element. Expressions may be created as XPaths, CSS selectors, or regular expressions. For example, an XPath expression may be used to parse specified content from an HTML document defining the layout of a webpage. Once an XPath expression is defined, it may be reused to repeatedly parse content from a webpage.

As noted above, webpages are typically constructed using HTML. In this implementation, the webpage is organized as a document object model (DOM) where the HTML has a tree structure. Within the DOM, HTML elements constitute nodes, and each node may include any number of other nodes. For example, the first element in the DOM may be a root node that includes all other elements within the page. By organizing the page as a tree structure, alike components of the page can be organized. For example, under the root node (e.g., the first HTML element), there may be two sub-nodes each used to define a portion of a webpage. For example, if the webpage is an e-commerce site, the first sub-node may be an area of the page to display a current product, and the second sub-node may be an area of the page to display related products. Since the DOM is organized as a tree structure, elements can be accessed by the links between elements in the DOM. Using the example above, if the first sub-node has child elements, these child elements are accessible once the first sub-node is reached.

An XPath is a type of expression used to navigate a DOM and access elements therein. Since the DOM has a tree structure, an XPath expression may be constructed to access nodes (e.g., HTML elements) within the DOM. For example, an XPath expression may list nodes within the DOM where the last value listed is returned by the expression. As a result, an XPath expression may be used to parse data from a DOM.

Current systems may use manual methods to define expressions. For example, the operator of a scraping system may access and download a webpage. The operator may then generate expressions (e.g., XPaths, CSS selectors, regular expressions) to access one or more elements within the downloaded webpage (e.g., the document). However, this process is both time consuming and expensive. Furthermore, since web pages are frequently updated, this process may miss updates to the webpage depending on when it is performed. For example, content on a webpage may be added, removed, and/or changed in the time it takes a current system to generate a set of scraping expressions.

Some current systems may attempt to leverage machine learning to identify the location of values within a webpage, or to better understand the layout of the webpage. However, these systems may only be able to parse the webpage. As a result, an entity interesting in building a web parser is forced to use the machine learning model each time it wishes to parse content from the target web page. This process is inefficient because inputting the document and request to the model requires more computing resources than applying an expression (e.g., an XPath) to the document. Additionally, if the model is updated (e.g., re-trained) it may return different results for the same page. Furthermore, if the model is hosted by a third party, the third party may charge a fee for each interaction with the model. Some systems may use machine learning to generate expressions or source code (e.g., Python code) to parse values from webpages, however these systems are often inaccurate. Thus, there is a need to more efficiently generate expressions to parse webpages.

To address such issues, embodiments herein describe a system that uses machine learning to generate scraping expressions. The system accesses the document of a webpage, and alters the page by inserting index values for each element within the webpage. For example, the system may add an index value as an attribute for each HTML element within the webpage. In some embodiments, the system may further alter the page by removing data within the webpage such as style data, source code data, elements within the webpage, or parts of elements within the webpage. The system may then receive a request for the index value of a particular element at the webpage. For example, a client device may submit a request such as "return an index value of the main product element within the webpage."

The system then interfaces with a machine learning model, such as a large language model (LLM) to generate expressions for the elements within the page. For example, a query is sent to the LLM including the modified webpage document, and a request asking the LLM to identify the element sought to be parsed. The query may further include a description (e.g., the main product) of the element to be parsed. The LLM returns the element and its corresponding index value. In some embodiments, the LLM may return, for example, an entire LLM element including the index value. In some embodiments, the LLM may return the index value and the content of the element. The system then constructs an expression configured to parse the element from the webpage using the returned index value. The expression may be generated using the modified version of the webpage document and the index value. The system may then use the expression to parse the element from the modified webpage document. Once the element is parsed, the system may generate a subsequent expression that may be used on the original unmodified version of the webpage document. The subsequent expression may be generated without reference to the index value. For example, the system may download a new copy of the webpage via its URL, and apply the subsequent expression to parse the element from the downloaded webpage.

This approach has numerous technical advantages over current systems because it allows for expressions to be generated and applied at scale. As noted above, webpage layouts may be changed frequently, and without warning. Thus, entities scraping webpages need to be able to quickly adapt to any new layouts. The system described herein can be leveraged to automatically generate new expressions to parse content in response to a detected change in the layout of a webpage. For example, a first set of expressions may be generated and used to parse content from a webpage. Each time content is parsed, it may be compared to expected content. For example, if the parsed content does not match the expected content, new expressions may be generated to accurately capture content from the webpage. Additionally, multiple expressions configured to parse the same content may be leveraged to parse data from a web page. For example, the system may maintain a set of multiple expressions configured to parse the same content from a webpage. The system may use all of these generated expressions, reasoning that by using multiple expressions, it's more likely that the content will be successfully parsed.

Various embodiments of these features will now be discussed with respect to the corresponding figures.

FIG. 1 depicts a block diagram illustrating various functional components of a scraping environment 100, according to some embodiments. Scraping environment 100 includes scrape system 110, network 120, scrape target 130, client device 140, model system 150, and proxy server 160.

Scrape system 110 may be implemented using one or more servers and/or databases. For example, scrape system 110 may include one or more proxy servers. In some embodiments, scrape system 110 may be implemented using a computing device such as a desktop workstation, laptop or notebook computer, netbook, tablet, smart phone, and/or other computing device. In some embodiments, scrape system 110 may be implemented as an application in an enterprise computing system and/or a cloud-computing system. In some embodiments, scrape system 110 may be a computer system such as computer system 500 described with reference to FIG. 5.

Scrape system 110 may be configured to receive requests. For example, client device 140 may send a request to scrape system 110 to generate expressions used to parse content from a target website (e.g., scrape target 130). In some embodiments, scrape system 110 may send the generated expressions to client device 140. In some embodiments, scrape system 110 may receive a request to parse content from a target website. Here, scrape system 110 may generate expressions configured to parse the requested content, parse the content, and send the content to the requesting entity (e.g., client device 140).

As will be discussed below, scrape system 110 may leverage a machine learning model, such as machine learning model 152 at model system 150 to generate expressions (e.g., XPaths) for scraping content from scrape target 130. Scrape system 110 includes storage device 112 and communication device 114.

Communications device 114 may be configured to communicate with scrape target 130 and client device 140. Communications device 114 may be configured to communicate via network 120. Communications device 114 may comprise any suitable network interface capable of transmitting and receiving data, such as, for example a modem, an Ethernet card, a communications port, or the like. Communications device 114 may be able to transmit data using any wireless transmission standard such as, for example, Wi-Fi, Bluetooth, cellular, or any other suitable wireless transmission.

Storage device 112 may be any memory device. Storage device 112 may be used to store generated expressions for content at scrape target 130. Storage device 112 may further be used to store parsed data from scrape target 130. For example, client device 140 may send a request to scrape system 110 to generate expressions configured to parse data from scrape target 130. Scrape system 110 may generate the expressions and save them within storage device 112. As an additional example, client device 140 may send a request to scrape system 110 to parse data from an e-commerce website (e.g., scrape target 130) to check the prices of certain products. Scrape system 110 may perform the scraping operation and save the product prices at storage device 112.

Scrape target 130 may be computer software and underlying hardware that accepts requests and returns responses via HTTP. Scraping environment may include any number of scrape targets 130. As input, scrape target 130 may take a path in an HTTP request, any headers in the HTTP request, and a body of the HTTP request, and use that information to generate content to be returned. The content served by the HTTP protocol is often formatted as a webpage, such as using HTML, CSS, and JavaScript. For example, scrape system 110 may send one or more HTTP requests to scrape target 130. Scrape target 130 may return content to scrape system 110 according to the HTTP request(s).

Client device 140 may be any entity attempting to leverage scrape system 110. Client device 140 may be a computer system such as computer system 500 described with reference to FIG. 5. Client device 140 may be a client system such as a desktop workstation, laptop or notebook computer, netbook, tablet, smart phone, and/or other computing device that may be using an enterprise computing system.

Client device 140 may interact with scrape system 110 in various ways. In an embodiment, client device 140 may send a request to scrape system 110. The request may be to identify an element sought to be parsed in a document at a target web page (e.g., at scrape target 130). For example, the request may include a URL of the target web page. The request may further include a description of a specific field (e.g., element) of interest. For example, if scrape target 130 is an e-commerce website, the description may be the price of a particular item sold at the e-commerce website. In some embodiments, client device 140 may request multiple elements sought to be parsed from a document at a target web page. For example, client device 140 may send a single request listing multiple elements at the target web page. In response to the request, scrape system 110 may return an acknowledgment that the request is received. In some embodiments, client device 140 may send a request including requests corresponding to multiple web pages. For example, the request may include two elements at a first web page, and three elements at a second web page.

Client device 140 may further provide a description of the element sought to be parsed. This may be beneficial to help the LLM (e.g., machine learning model 152) identify the correct element to return. For example, client device 140 may desire to parse a main product on an e-commerce webpage. However, the webpage may include other products such as similar products, products frequently purchased with the main product, and/or suggested products. Here, client device 140 may provide a description such as "return the index value of the HTML element corresponding to the main product." As will be discussed below, the LLM may use the description to identify the correct HTML element.

In response to the request, scrape system 110 may request content identified in the request from scrape target 130. For example, scrape system 110 may download the webpage at the URL specified within the request. As noted above, the request may include multiple URLs. As a result, scrape system 110 may download the webpage at each URL. Scrape system 110 may store the downloaded webpage(s) as documents. Scrape system 110 may store the documents at storage device 112.

In some embodiments, scrape system 110 may not send the requests directly to scrape target 130 and instead send them through at least one intermediary proxy server. For example, scrape system 110 may send requests through proxy server 160. Although a single proxy server 160 is depicted, scraping environment 100 may include multiple proxy servers 160. Proxy server 160 may be implemented using one or more servers and/or databases. For example, proxy server 160 may include one or more proxy servers. In some embodiments, proxy server 160 may be implemented using a computing device such as a desktop workstation, laptop or notebook computer, netbook, tablet, smart phone, and/or other computing device. In some embodiments, proxy server 160 may be implemented as an application in an enterprise computing system and/or a cloud-computing system. In some embodiments, proxy server 160 may be a computer system such as computer system 500 described with reference to FIG. 5.

To send the request to proxy server 160, a proxy protocol may be used. To send a request according to an HTTP proxy protocol, the full URL may be passed, instead of just the path. Also, credentials may be required to access the proxy. All the other fields for an HTTP request must also be determined. To reproduce an HTTP request, scrape system 110 may generate all the different components of each request, including a method, path, a version of the protocol that the request wants to access, headers, and the body of the request. In some embodiments, multiple proxy servers 160 may be used. For example, the request may include two proxy servers 160. The first proxy server 160 may receive the request from scrape system 110 and forward it to a second proxy server 160. The second proxy server 160 may forward the request to scrape target 130, receive the results, and forward the results to the first proxy server 160. Subsequently, the first proxy server 160 may send the results to scrape system 110.

Each scrape may represent a sequence of request-and-response interactions with scrape target 130. This, for example, may serve to retrieve or establish session information for scrape target 130 to return the results identified in the request. For example, a website (e.g., scrape target 130) may use cookies to track interactions (e.g. sessions) with client device 140.

An HTTP cookie (usually just called a cookie) is a simple computer data structure made of text written by a web server in previous request-response cycles. The information stored by cookies can be used to personalize the experience when using a website. A website can use cookies to find out if someone has visited a website before and record data about what they did. When someone is using a computer to browse a website, a personalized cookie data structure can be sent from the website's server to the person's computer. The cookie is stored in the web browser on the person's computer. At some time in the future, the person may browse that website again. When the website is found, the person's browser checks whether a cookie for that website is found and available. If a cookie is found, then the data that was stored in the cookie before can be used by the website to tell the website about the person's previous activity. Some examples where cookies are used include shopping carts, automatic login, and remembering which advertisements have already been shown.

Because many websites require session information, usually stored in cookies but possibly received in other data from previously visited retrieved pages, scrape system 110 may reproduce a series of HTTP requests and responses to scrape data from scrape target 130. For example, to scrape search results, embodiments described herein may first request the page of the general search page where a human user would enter her search terms in a text box on an HTML page. If it were a human user, when the user navigates to that page, the resulting page would likely write a cookie to the user's browser and would present an HTML page with the text box for the user to enter her search terms. Then, the user would enter the search terms in the text box and press a "submit" button on the HTML page presented in a web browser. As a result, the web browser would execute an HTTP POST or GET operation that results in a second HTTP request with the search term and any resulting cookies. According to an embodiment, scrape system 110 may reproduce both HTTP requests, using data, such as cookies, other headers, parameters or data from the body, received in response to the first request to generate the second request.

Once scrape system 110 downloads the webpage (e.g., the document), it may prune the document. For example, scrape system 110 may remove any data within the document such as style data, source code, elements sought to be removed, and/or parts of elements sought to be removed. For example, scrape system 110 may remove style data, such as CSS data. Scrape system 110 may further remove source code data within the document, such as JavaScript. Scrape system 110 may include a list of elements sought to be removed from the document, and/or a list of parts of elements sought to be removed from the document. In some embodiments, client device 140 may send the list to scrape system 110. For example, scrape system 110 may remove all HTML elements that start with "<p>". Similarly, scrape system 110 may remove parts of elements within the document, such as style attributes or language attributes within HTML elements. Pruning the document is beneficial to reduce the amount of computing resources spent parsing the document to generate expressions. Pruning is also beneficial to save network resources in scenarios where the pruned document is transmitted over a network, such as network 120, to be analyzed by machine learning system 150. Scrape system 110 may save copies of both the unpruned, and pruned document. Scrape system 110 may store copies at storage device 112.

In some embodiments, scrape system 110 may not prune the document (e.g., downloaded webpage). Here, scrape system 110 may retrieve and store the document at storage device 112.

Scrape system 110 may generate index values for elements within the document. Each element may have a unique index value. The index value may be any unique value such as a number, string, or any combination thereof. In some embodiments, the index value may be a hash of the element. Scrape system 110 may insert the index value for each element within the document. For example, if the document is an HTML document, scrape system 110 may insert the index value as an HTML attribute within the HTML element. The index value may be a key: value pair, where the key is "idx" or "index," and the value is the index value (e.g., 400). For example, an e-commerce webpage may include a "price" element with an assigned index value "100." In some embodiments, all elements within the document may have unique index values. Scrape system 110 may store the index values assigned to each element within the document at storage device 112. Scrape system 110 may further store a copy of the document with the index values added (e.g., a copy of the modified document).

As noted above, scrape system 110 may prune the document. For example, scrape system 110 may remove style, source code, elements, and/or parts of elements from the document. In some embodiments, scrape system 110 may first prune the document, and subsequently add index values for each element once the document is pruned. In some embodiments, scrape system 110 may add index values while pruning the document. In some embodiments, scrape system 110 may first add index values to the document, and then subsequently prune the document.

Scrape system 110 may generate a data structure. The data structure may include: (1) the original version of the document downloaded; (2) the pruned version of the document; (3) the pruned version of the document with index values added; and (4) a dictionary of key: value pairs, where the key is the element and the value is the index value. Scrape system 110 may store the data structure at storage device 112.

Once scrape system 110 assigns an index value to each element, it may generate a query for model system 150. The query may include the modified document and a request for the machine learning model (e.g., LLM) to identify the element. The request may further include a description of the element sought to be parsed. The description and request may be formatted as natural language (e.g., English text). As noted above, client device 140 may provide a description of the element to be parsed within its request. Here, scrape system 110 may copy the description into the query sent to model system 150. Providing the pruned (e.g., modified) document, as opposed to the original document, may be beneficial for computing and networking performance. For example, by sending the modified document with style source code, elements, and/or parts of elements removed, there is less data for the LLM (e.g., machine learning model 152) to analyze, thus reducing the amount of computing power required. The other benefit of this approach is that since there is less data in the modified document, there is a lower chance that the LLM will return incorrect data. For example, since the style and source code data are removed in the modified version of the document, the LLM cannot reference the style and source code data when analyzing the document. Additionally, if scrape system 110 sends the query to model system 150 over a network, less data needs to be transmitted when the modified version of the document is sent. Additionally, in some embodiments model system 150 may be operated by a third party that charges a fee based on the size of the input (e.g., the size of the document). Reducing the size of the document through the pruning process will therefore reduce the cost associated with using a third party model system 150.

Although a single model system 150 is depicted, scraping environment 100 may include multiple model systems 150. Additionally, although model system 150 is depicted as being separate from scrape system 110, in some embodiments, model system 150 may be part of scrape system 110. For example, scrape system 110 and model system 110 may exist on the same computing device. Model system 150 may be implemented using one or more servers and/or databases. For example, model system 150 may include one or more proxy servers. In some embodiments, model system 150 may be implemented using a computing device such as a desktop workstation, laptop or notebook computer, netbook, tablet, smart phone, and/or other computing device. In some embodiments, model system 150 may be implemented as an application in an enterprise computing system and/or a cloud-computing system. In some embodiments, model system 150 may be a computer system such as computer system 500 described with reference to FIG. 5. Model system 150 may input a query from scrape system 110 to machine learning model 152.

Although a single machine learning model 152 is depicted, model system 150 may include any number of machine learning models 152. Machine learning model 152 may be built with any configuration or architecture. Machine learning model 152 may be a support vector machine, perceptron, artificial neural network, convolutional neural network, recurrent neural network. In some embodiments, machine learning model 152 may be a large language model (LLM). A large language model (LLM) is a type of artificial intelligence (AI) program that can perform natural language processing (NLP) tasks by analyzing and understanding text. LLMs are trained on large amounts of data, such as books, articles, and internet text, to learn how language works and can generate meaningful responses. LLMs can be used for text generation, a form of generative AI, by taking an input text and repeatedly predicting the next token or word. An example of a Large Language Model is GPT, such as GPT2, GPT3, GPT4 available from OpenAI.

Machine learning model 152 may be trained to input a document, a description of an element sought within the document, and a request to identify the element sought based on the description. Machine learning model 152 may use the description and request to identify the element within the document. For example, the document may be the main product page at an e-commerce website. The document may further include suggested products and similar products. The description may be "the HTML element of the main product." As an additional example, the description may be "the HTML element corresponding to the current price of Product X." Here, machine learning model 152 may reference the description to determine that the main product element, as opposed to the suggested or similar product elements, should be used. Machine learning model 152 may return information related to the element. For example, machine learning model 152 may be trained to return the element including the index value assigned by scrape system 110. Model system 150 may return the element and index value to scrape system 110.

In some embodiments, the element may be the HTML element including the index value. For example, the element may be: "<button idx="100"> Click here!</button>". As a result, model system 150 may return: "<button idx="100"> Click here!</button>". In some embodiments, the element returned by model system 150 may be part of the HTML element that includes the index value. For example, model system 150 may return the content of the HTML element. Using the example above, model system 150 may return the index value and "element: Click here!", indicating the content of the element that corresponds to the index value. For efficiency, by default the element returned by model system 150 may be the partial element (e.g., the HTML content). Model system 150 may return the entire HTML element as the element based on the description provided by client device 140 and/or scrape system 110.

As an additional example, the modified document may include an element such as: "<h2 index=111, id="intent"><i class="fa fa-flip-horizontal fa-comment-alt-dots" aria-hidden="true" index=112></i> PC</h2>". When client device 140 and/or scrape system 110 request the entire HTML element, then model system 150 may return: "index: 111; element: <h2 index=111, id="intent"><i class="fa fa-flip-horizontal fa-comment-alt-dots" aria-hidden="true" index=112></i> PC</h2>." By default, model system 150 may return: "index: 111; element: PC."

Scrape system 110 generates an expression (e.g., a first expression) using the returned index value. The expression may be configured to access the element within the document. For example, the expression may define a path to the element in the document that was assigned to the index. In other words, the expression may be the result of searching the document for the index value returned by model system 150. The expression may be configured to access the element within the modified (e.g., pruned) version of the document. The expression may be an XPath expression, a CSS selector, or a regular expression. For example, the modified document, and the index value may be input to an API configured to generate an XPath, CSS selector, or regular expression configured to access the element within the modified document corresponding to the index value.

As noted above, a first expression may be generated using the returned index value. Scrape system 110 may then generate a second (e.g., final) expression to parse the element that was assigned to the index value. The final expression may be generated using the original, unmodified (e.g., unpruned) version of the document. Noted above, the first expression returns the element corresponding to the index value. Scrape system 110 may generate the final expression by inputting the element and the original document to an API configured to generate an XPath, CSS selector, regular expression, or any other parsing expression.

The expression (e.g., first expression, second expression) may be a relative path or an absolute path to the element. A relative path may relate to other elements within the webpage. An absolute path may include an entire path from the start of the document to the element sought.

In some embodiments, scrape system 110 may send the expressions (e.g., first expression generated via the index value, and the final expression generated using the element) to client device 140. Scrape system 110 may be further configured to store the generated expressions in association with the document at storage device 112. In some embodiments, scrape system 110 may use the expression to parse data from the document. For example, scrape system 110 may apply the final, second expression to the document to retrieve (e.g., parse) the element. For example, scrape system 110 may access the target webpage URL and download a second document. Scrape system 110 may apply the final expression to the second document to parse data from the second document. Scrape system 110 may then send the parsed data to client device 140.

In some embodiments, scrape system 110 may verify the accuracy of the generated expression. For example, scrape system 110 may verify the accuracy of the second generated expression based on the original unmodified document. Scrape system 110 may verify the accuracy by comparing data parsed from the document to an expected parse data. For example, scrape system 110 may compare the values of parsed data to the values of element data in the original document to determine whether they match. For example, scrape system 110 may compare parsed HTML content to expected HTML content of the element in the original document. In some embodiments, scrape system 110 may compare a type of the parsed data to a type of element in the original document. For example, scrape system 110 may compare a parsed HTML element tag to an expected HTML element tag. In some embodiments, scrape system 110 may obtain the expected parsed data from a prior parse operation. In some embodiments, client device 140 may provide the expected parse data.

If the parsed data does not match the expected parsed data, scrape system 110 may generate a new expression or update the current expression. For example, scrape system 110 may re-obtain (e.g., re-download) a copy of the webpage at the URL hosted by scrape target 130. Scrape system 110 may prune (e.g., remove) style and source code from the document. Scrape system 110 may add an index value to each element within the document. For example, if the document is formatted as HTML, the index value may be added as an attribute to each element. Subsequently, scrape system 110 may receive a request from client device 140 for an expression to parse data at a web page. The request may include a specific element within the webpage, or may be a request for all elements at the web page.

Scrape system 110 may then send the modified document to model system 150. Scrape system 110 may further include a request description of an element to be parsed from the document, and a request asking an LLM (e.g., machine learning model 152) at model system 150 to identify the element sought to be parsed. Once model system 150 returns the index value, scrape system 110 may generate a first expression configured to access the element within the modified document based on the index value. Scrape system 110 may then generate a second expression configured to access the element within the original unmodified version of the document, based on the element retrieved using the first expression. As stated above, scrape system 110 may store the new expressions, apply the new second expression to parse data from the document and send it to client device 140, send the new expressions to client device 140, or any combination thereof.

In some embodiments, scrape system 110 may utilize multiple expressions, corresponding to the same element to parse data from a webpage at scrape target 130. For example, the webpage sought to be parsed at scrape target 130 may be frequently updated. The updates may include minor changes to the layout of the webpage. Instead of applying a single expression to parse element data from the webpage, scrape system 110 and/or client device 140 may utilize multiple expressions corresponding to the same element, the idea being that the more expressions used, the more likely one will work and return the element data.

Figure 2A:
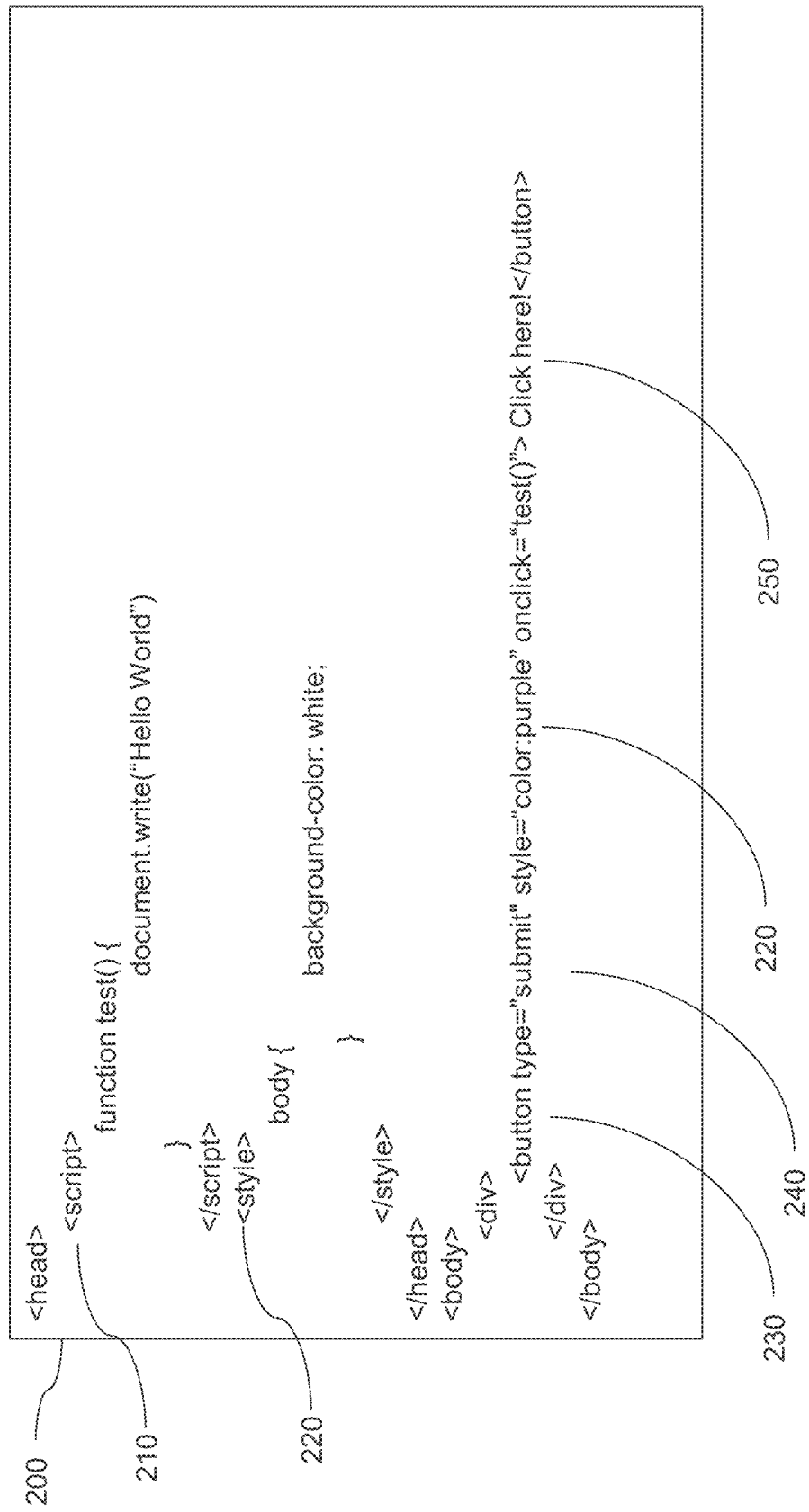
FIGS. 2A-2B are block diagrams illustrating a document, according to some embodiments.

FIG. 2A is a block diagram illustrating a document 200, according to some embodiments. Document 200 may be a webpage hosted by scrape target 130. Document 200 may include HTML, CSS, and JavaScript. For example, document 200 may include script 210 used to programmatically add functionality to document 200. For example, script 210 may be JavaScript used to define the functionality of a button displayed at document 200. Document 200 may include style 220 defining how items within document 200 are displayed. For example, style 200 may be CSS defining the size, color, and font of items within document 200. Document 200 may further include element 230. Element 230 may be an item on document 200. For example, element 230 may be a button shown on document 200. Element 230 may include attribute 240 that defines a property of element 230. Element 230 may include content 250. Content 250 may be any data displayed at document 200 according to script 210, style 220, element 230, and/or attribute 240. For example, element 230 may be a button, and content 250 may be the text "Click here!" that is displayed on the button. Additionally, style 220 may how content 250 looks. For example, style 220 may define the color or font of content 250.

Figure 2B:
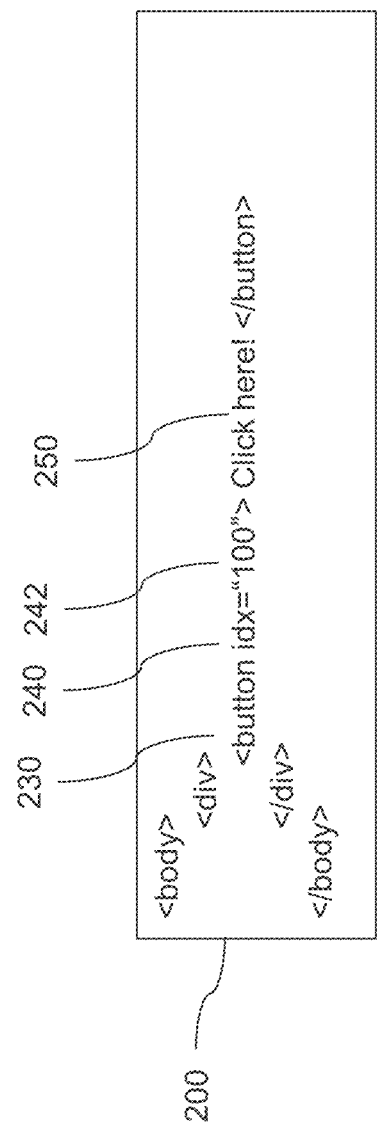

FIG. 2B is a block diagram illustrating a document 200, according to some embodiments. Document 200 may be the pruned document after scrape system 110 removes script 210 and style 220. As a result, document 200 may still include element 230. Document 200 may further include attribute 240 corresponding to an index. Scrape system 110 may further generate and insert index value 242. For example, index value 242 may be "100." In some embodiments, each element may have a unique index value 242. This may be beneficial so that an expression to parse element 230 from document 200 is configured to retrieve all instances of element 230.

Figure 3:
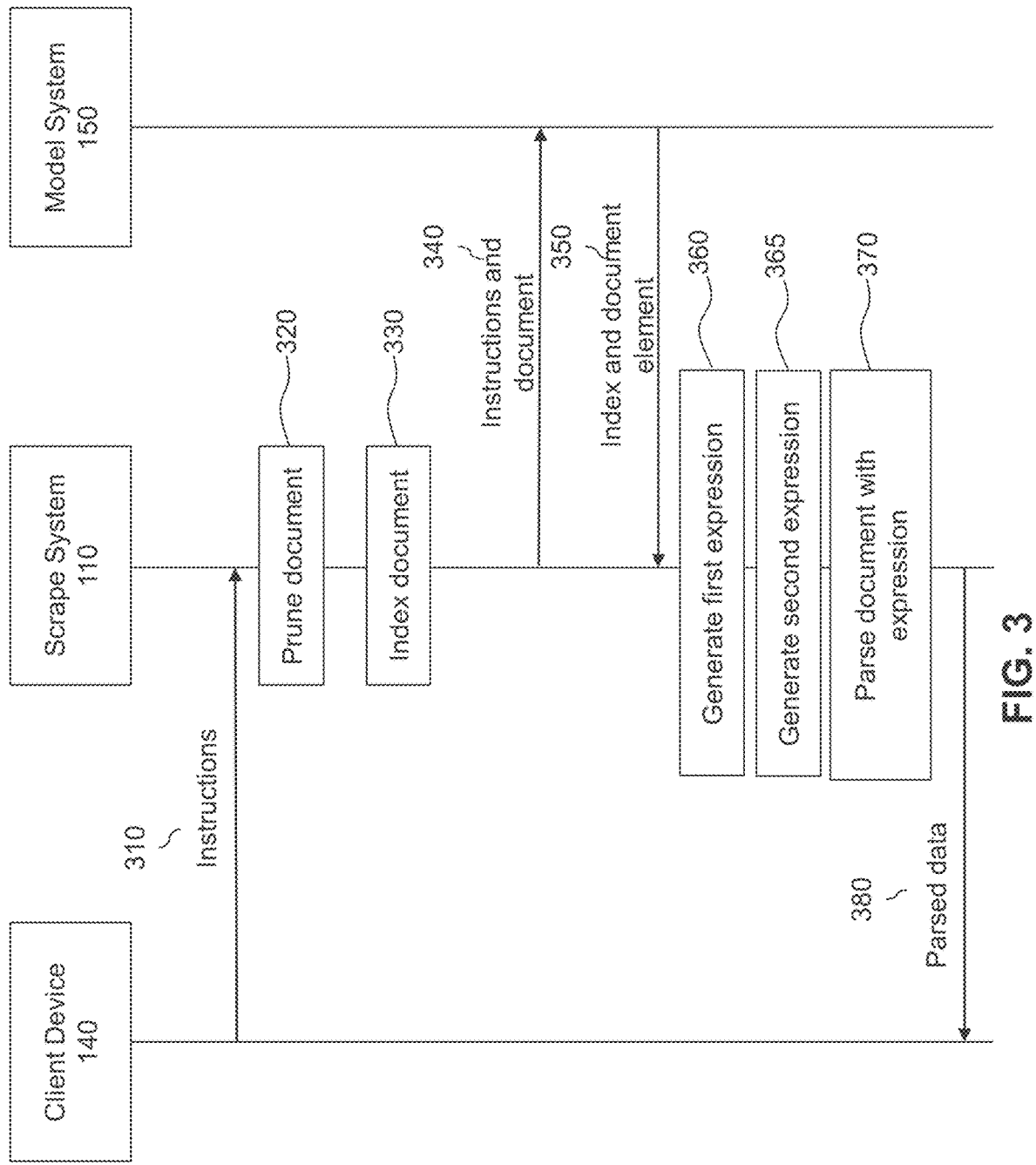
FIG. 3 is a diagram illustrating a method for using machine learning to generate a parsing expression, according to some embodiments.

FIG. 3 depicts a diagram illustrating a method 300 for using machine learning models to generate scraping expressions, according to some embodiments. Method 300 shall be described with reference to FIG. 1, however, method 300 is not limited to that example embodiment.

In an embodiment, scrape system 110 may utilize method 300 to utilize a machine learning model (e.g., LLM) to generate a scraping expression. The foregoing description will describe an embodiment of the execution of method 300 with respect to scrape system 110. While method 300 is described with reference to scrape system 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3.

At 310, scrape system 110 receives instructions. The instructions may include a request to identify an element to parse in a document at a target webpage. In some embodiments, the instructions may include a request to generate a parsing expression for the element, or a request to parse data corresponding to the element. For example, the instructions may include a URL (e.g., webpage), and an element (e.g., "product A"). The request may originate from client device 140. The target web page may be located at scrape target 130. In some embodiments, scrape system 110 may further receive the document representing the target webpage. For example, client device 140 may include the document along with the instructions sent to scrape system 110. In some embodiments, scrape system 110 may retrieve (e.g., download) the webpage from the target website (e.g., scrape target 130) identified in the instructions. The document may include HTML, CSS, JavaScript, or any combination thereof. Scrape system 110 may store the document in association with the target webpage URL.

At 320, scrape system 110 modifies (e.g., prunes) the document. The document may be an HTML document. In some embodiments, the document may be a tree structure according to a document object model (DOM). Scrape system 110 may remove style data such as CSS and source code data such as JavaScript from the HTML. In some embodiments, scrape system 110 may remove style data, but not source code data. Similarly, scrape system 110 may remove source code data, but not style data. Scrape system 110 may further remove elements or parts of elements from the document. Scrape system 110 may store the modified document in association with the target webpage URL.

At 330, scrape system 110 indexes the document. Scrape system 110 may index the document by generating an index value for each element within the document. Scrape system 110 may alter the document by inserting the generated index value for each element. For example, if the document is built using HTML, scrape system 110 may insert the index value as an attribute within the element. For example, the attribute may be: idx="400". Scrape system 110 may store a dictionary or other data structure mapping each element and generated index value. Scrape system 110 may store the dictionary (e.g., data structure) in association with the target webpage URL.

At 340, scrape system 110 transmits the instructions and document to model system 150. The document may be the modified document with the style, source code, elements, and/or parts of elements removed, and the index values included. The instructions may be to retrieve the index value of an element that is sought to be parsed by, for example, client device 140. In some embodiments, the instructions may include a description of the element. For example, the instructions may state "please return the index value corresponding to the element 'price' within the attached document."

At 350, scrape system 110 receives an index value and a corresponding document element (e.g., HTML element) from model system 150. As discussed above, model system 150 may include an LLM such as model system 152. The LLM may input the modified document, instructions, and return the index value included in the modified document based on the instructions. For example, the LLM may output "{'price': 400}". Similarly, the LLM may output "{index: 400; element: 'price'}" where "price" is the content (e.g., content 250) within the HTML element (e.g., element 230), and 400 is index value 242 of attribute 240 within the HTML element. In some embodiments, the LLM may output the entire HTML element (e.g., element 230) as the element listed above. The entire HTML element may include the content/field (e.g., price), the index value (e.g., 400), and any other HTML data present in the element (e.g., tags, attributes). As noted above, the LLM may be trained to parse a document and identify a requested item. For example, the LLM may be trained to input a webpage and search the webpage for an element. As noted above, he LLM may output the entire element (e.g., element 230), including the index value assigned by scrape system 110. In some embodiments, the LLM may output part of the element such as the content (e.g., content 250) of the element and the index value. Model system 150 may return the LLM output to scrape system 110.

At 360, scrape system 110 generates an expression based on the index value. The generated expression may be a first expression. For example, scrape system 110 may input the modified document and the index value to an API to generate an XPath, CSS selector, regular expression, or any other expression to access the element using the index value. As noted above, the document may include one or more HTML elements. The document may be organized as a tree using a document object model (DOM). As a result, each HTML element may be a node within the DOM structure. If the expression is an XPath, scrape system 110 may traverse the tree structure of the DOM searching for the element including the index value. Once scrape system 110 identifies the element including the index value sought, scrape system 110 may generate the expression by listing each node (e.g., element) traversed to reach the element including the index value. Scrape system 110 may store the generated expression in association with the target webpage URL.

At 365, scrape system 110 generates a second expression. The second expression may be generated using the element without reference to the index value. The element may be the element returned by applying the expression based on the index value (e.g., the expression generated at 360). Here, the expression generated using the element may be referred to as a final expression or a second expression. The final expression may be configured to parse the element from an unpruned (e.g., unmodified) version of the webpage. The final expression may be an XPath, CSS selector, regular expression, or any other expression to access the element.

At 370, scrape system 110 may parse the document using the final expression. For example, the expression may be configured to navigate the DOM within the document by traversing nodes (e.g., HTML elements) in the expression. The data returned by the expression may correspond to a final element reached via the expression. For example, an expression generated at 360 may be "/home/products/kitchen/coffee/coffee_maker[1]"." As a result, scrape system 110 may traverse the nodes (e.g., elements) in the document based on the expression, to return, for example "coffee_maker_A."

At 380, scrape system 110 returns the parsed data to client device 140. In some embodiments, scrape system 110 may also send the generated expression to client device 140.

Figure 4:
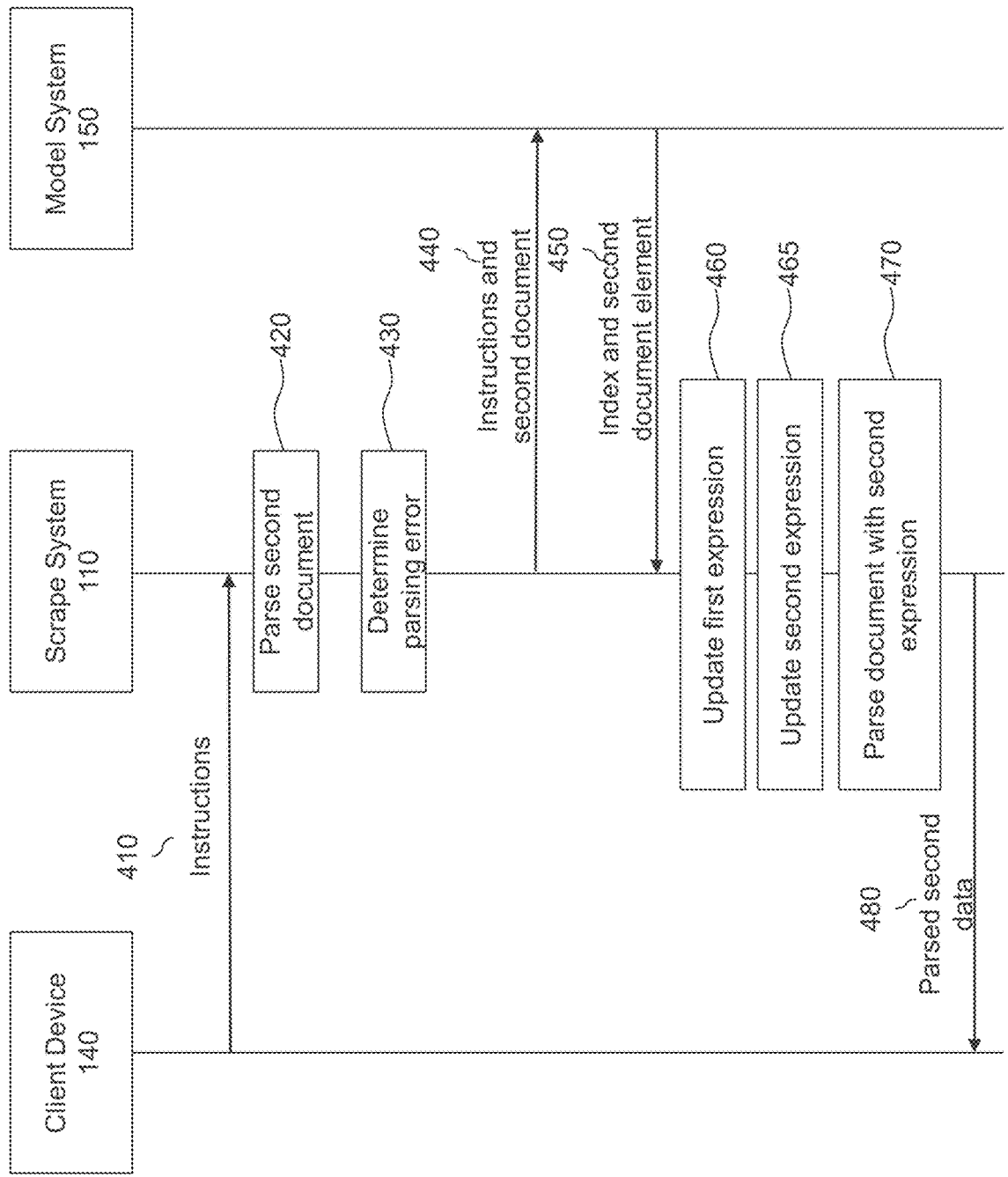
FIG. 4 is a diagram illustrating a method for utilizing multiple parsing expressions, according to some embodiments.

FIG. 4 depicts a diagram illustrating a method 400 for utilizing multiple parsing expressions, according to some embodiments. Method 400 shall be described with reference to FIG. 1, however, method 400 is not limited to that example embodiment.

In an embodiment, scrape system 110 may use method 400 to determine whether a scraping expression needs to be updated. As discussed above, scrape system 110 may leverage a machine learning model to generate one or more expressions. Each expression may be configured to locate and parse an element from a document (e.g., an HTML document). However, since webpages are often updated to show new content, the webpage may have changed since the expressions were generated. As a result, the generated expressions may no longer parse data from the current state of the web page, or it may parse incorrect data. As a result, the expressions are updated.

The foregoing description will describe an embodiment of the execution of method 400 with respect to scrape system 110. While method 400 is described with reference to scrape system 110, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4.

At 410, scrape system 110 receives instructions from client device 140. The instructions may include a request to identify an element to parse in a document at a target webpage or a request to parse data corresponding to an element. The target webpage may be the same target webpage discussed above in 310. Scrape system 110 may download a second document from the target web page. The second document may be document 200 of a webpage at scrape target 130. The second document may be accessible via a URL at scrape target 130. The second document may be retrieved after scrape system 110 generated expressions to retrieve one or more elements from document 200 at the webpage. For example, scrape system 110 may have previously retrieved a first document 200 at the URL and used the first document 200 to generate one or more expressions to access elements within the first document. As described above, scrape system 110 may have stored the generated expressions associated with the webpage URL.

As noted above, scrape system 110 may download the second document from scrape target 130 in response to a request from client device 140. For example, client device 140 may submit a request to scrape system 110 parse data from the URL at scrape target 130. In response, scrape system 110 may access and download the second document via a series of HTTP and/or HTTPS requests.

At 420, scrape system 110 parses (e.g., extracts) data from the second document using the generated expression. As noted above, the generated expression may be used to parse an element from the second document (e.g., document 200). The second document may be the original, unmodified version of the document. The generated expression may be an XPath configured to traverse the DOM within the document to parse one or more HTML elements. Similarly, the generated expression may be a CSS selector or regular expression.

At 430, scrape system 110 detects a parsing error. For example, scrape system 110 may determine the parsed data differs from expected data of the element in the document. For example, the expected data may be "Price" and the parsed data may be "Quantity." Similarly, scrape system 110 may determine that a type of the parsed data differs from an expected type of the element in the document. For example, the expected data type may be an integer and the parsed data may be a string. Similarly, the expected data type may be a paragraph HTML tag, but the parsed data type may be a button HTML tag. Additionally, scrape system 110 may apply the expression and an error may be returned. An error may be returned in an instance where no data exists in the second document at the path defined in the expression.

At 440, scrape system 110 transmits the instructions and second document to model system 150. Prior to transmitting the second document, scrape system 110 may modify the second document by removing style, elements, parts of elements, and/or source code. Additionally, scrape system 110 may insert index values as attributes within each element of the second document. The instructions may be to retrieve the index value of an element that was attempted to be parsed but failed. In some embodiments, the instructions may include a description of the element. For example, the instructions may state "please return the index value corresponding to the element 'price' within the attached document."

At 450, scrape system 110 receives an index value and a corresponding document element from model system 150. As discussed above, model system 150 may include an LLM such as model system 152. The LLM may input the modified second document, instructions, and return the index value included in the modified second document based on the instructions. In some embodiments, the LLM may output part of the HTML element and the index value. For example, the LLM may output "{'price': 400}". Here, price may correspond to content 250 within element 230. Similarly, 400 may be index value 242 added as attribute 240. In some embodiments, the LLM may output the entire HTML element (e.g., element 230) including the index value and the content (e.g., price). As noted above, the LLM may be trained to parse a document and identify a requested item. For example, the LLM may be trained to input a webpage and search the webpage for an element. The LLM may output the entire element, including the index value assigned by scrape system 110. Model system 150 may return the LLM output to scrape system 110.

At 460, scrape system 110 updates the first expression. As discussed above, the first expression may be an expression generated using the index value to parse the element from the pruned (e.g., modified) version of the document. The updated first expression may be an XPath, CSS selector, regular expression, or any other type of parsing expression. For example, the updated first expression may be an XPath configured to access the element corresponding to the index value within the modified second document. As noted above, the second document may include one or more HTML elements. The second document may be organized as a tree using a document object model (DOM). As a result, each HTML element may be a node within the DOM structure. To generate the XPath, scrape system 110 may traverse the tree structure of the DOM searching for the element including the index value. Once scrape system 110 identifies the element including the index value sought, scrape system 110 may generate the expression by listing each node (e.g., element) traversed to reach the element including the index value. Scrape system 110 may store the updated first expression in association with the target webpage URL.

At 465, scrape system 110 updates the second expression. As discussed above, the second expression (e.g., final expression) may be the expression used to parse the element from the original, unmodified version of the document. Scrape system 110 may update the second expression by inputting the element parsed using the first expression, and a copy of the second unmodified document into an API. The updated second expression may be generated without reference to the index value. The updated second expression may define a path to the element in the second unmodified document.

At 470, scrape system 110 parses second data from the second document using the second expression. For example, the second expression may be an XPath and scrape system 110 may apply the XPath to parse (e.g., extract) an element (e.g., second data) from the second document. Similarly, the second expression may be a CSS selector or regular expression configured to parse the element from the second document.

At 480, scrape system 110 sends the parsed second data to client device 140. Scrape system 110 may store the parsed second data as expected data in association with the second expression. This may be beneficial to verify the second expression continues to successfully extract the correct element.

The disclosure presents a computer-implemented method for scraping content from a target URL, comprising:
  (a) receiving a request to identify an element sought to be parsed in a first document accessible at a target web page;
  (b) downloading the first document from a uniform resource locator (URL) at the target web page;
  (c) for respective elements in the plurality of elements, modifying the first document by adding an index value as an attribute to the tag for the respective element;
  (d) submitting, to a large language model, a query comprising the modified first document, a description of the element sought to be parsed from the plurality of elements, and a request asking the large language model to identify the element sought to be parsed based on the description;
  (e) obtaining, from the large language model, the index value assigned to the element sought to be parsed;
  (f) generating an expression defining a path to the element in the first document based on the index returned by the large language model;
  (g) downloading a second document from the URL at the target web page;
  (h) parsing, from the second document, data of a second element using the expression.

The method is presented, wherein modifying the first document further comprises removing from the first document at least one of JavaScript, cascading style sheet (CSS), an element sought to be removed, or part of an element sought to be removed.

The method is presented, wherein retrieving the webpage addressed at the target URL (a) comprises searching HTML at the target URL webpage for a specific content.

The method is presented, wherein the query is formatted as natural language.

The method is presented, wherein the generated expression comprises an XPath, a cascading style sheet (CSS) selector, or a regular expression.

The method is presented, wherein the generated expression is a second expression, and wherein (e) further comprises: generating a first expression defining a path to the element in the modified first document by referencing the index value.

The method is presented, further comprising:
  determining a type of the parsed data of the second element matches a type of the element in the first document;
  storing the parsed data and the expression, in association with the second document.

The method is presented, further comprising:
  determining a type of the parsed data of the second element is different from a type of the element in the first document;
  generating a second expression configured to access the element by repeating steps (c)-(f) for the second document; and
  parsing, from the second document, second data of the second element using the second expression.

A system is presented for scraping content from a target URL, comprising:
  at least one processor;
  a memory configured to:
    (a) receive a request to identify an element sought to be parsed in a first document accessible at a target web page;
    (b) download the first document from a uniform resource locator (URL) at the target web page;
    (c) for respective elements in the plurality of elements, modify the first document by adding an index value as an attribute to the tag for the respective element;
    (d) submit, to a large language model, a query comprising the modified first document, a description of the element sought to be parsed from the plurality of elements, and a request asking the large language model to identify the element sought to be parsed based on the description;

(e) obtain, from the large language model, the index value assigned to the element sought to be parsed;

(f) generate an expression defining a path to the element in the first document that was assigned to the index returned by the large language model;

(g) download a second document from the URL at the target web page;

(h) parse, from the second document, data of a second element using the expression.

The system is presented, wherein to modify the first document, the at least one processor is further configured to remove from the first document at least one of JavaScript, cascading style sheet (CSS), an element sought to be removed, or part of an element sought to be removed.

The system is presented, wherein the query is formatted as natural language.

The system is presented, wherein the generated expression comprises an XPath, a cascading style sheet (CSS) selector, or a regular expression.

The system is presented, wherein the generated expression is a second expression, and wherein the at least one processor is further configured to:
generate a first expression defining a path to the element in the modified first document by referencing the index value; and
generate the second expression by referencing the element parsed from the modified first document using the first expression, wherein the second expression is configured to parse the element in the second document.

The system is presented, wherein the at least one processor is further configured to:
determine a type of the parsed data of the second element matches a type of the element in the first document; and
store the parsed data and the expression, in association with the second document.

The system is presented, wherein the at least one processor is configured to:
determine a type of the parsed data of the second element is different from a type of the element in the first document; and
generate a second expression configured to access the element by repeating steps (c)-(f) for the second document; and
parse, from the second document, second data of the second element using the second expression.

The disclosure presents a non-transitory computer-readable device having instructions stored thereon is presented that, when executed by at least one computing device, cause the at least one computing device to perform operations, comprising: (a) receiving a request to identify an element sought to be parsed in a first document accessible at a target web page;
(b) downloading the first document from a uniform resource locator (URL) at the target web page;
(c) for respective elements in the plurality of elements, modifying the first document by adding an index value as an attribute to the tag for the respective element;
(d) submitting, to a large language model, a query comprising the modified first document, a description of the element sought to be parsed from the plurality of elements, and a request asking the large language model to identify the element sought to be parsed based on the description;

(e) obtaining, from the large language model, the index value assigned to the element sought to be parsed;

(f) generating an expression defining a path to the element in the first document that was assigned to the index returned by the large language model;

(g) downloading a second document from the URL at the target web page;

(h) parsing, from the second document, data of a second element using the expression.

The device is presented, wherein to modify the first document, the operations further comprise removing from the first document at least one of JavaScript, cascading style sheet (CSS), an element sought to be removed, or part of an element sought to be removed.

The device is presented, wherein the generated expression comprises an XPath, a cascading style sheet (CSS) selector, or a regular expression.

The device is presented, wherein the generated expression is a second expression, and wherein (e) further comprises:
generating a first expression defining a path to the element in the modified document by referencing the index value; and
generating the second expression by referencing the element parsed from the modified first document using the first expression, wherein the second expression is configured to parse the element in the second document.

The device is presented, the operations further comprising:
determining a type of the extracted data of the second element matches a type of the element in the first document;
storing the parsed data and the expression, in association with the second document.

The device is presented, the operations further comprising:
determining a type of the parsed data of the second element is different from a type of element in the first document;
generating a second expression configured to access the element by repeating steps (c)-(f) for the second document; and
parsing, from the second document, second data of the second element using the second expression.

Figure 5:
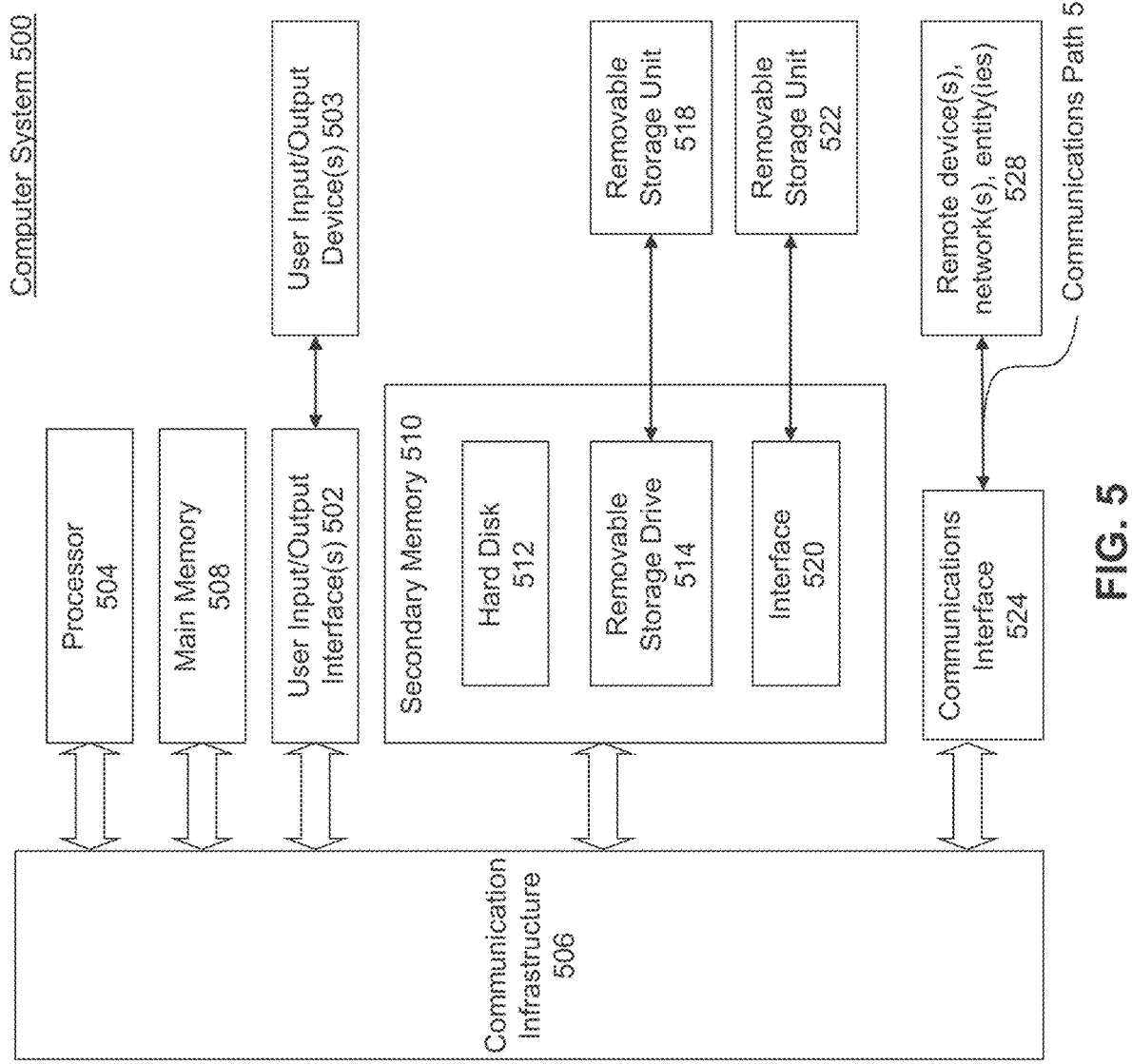
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for parsing a document formatted using a markup language, the document including a plurality of elements each separated using a tag, comprising:
   (a) receiving a request to identify an element sought to be parsed in a first document accessible at a target web page;
   (b) downloading the first document from a uniform resource locator (URL) at the target web page;
   (c) for respective elements in the plurality of elements, modifying the first document by adding an index value as an attribute to the tag for the respective element;
   (d) submitting, to a large language model, a query comprising the modified first document, a description of the element sought to be parsed from the plurality of elements, and a request asking the large language model to identify the element sought to be parsed based on the description;
   (e) obtaining, from the large language model, the index value assigned to the element sought to be parsed;
   (f) generating an expression defining a path to the element in the first document that was assigned to the index value returned by the large language model;
   (g) downloading a second document from the URL at the target web page; and
   (h) parsing, from the second document, data of a second element using the expression.

2. The computer implemented method of claim 1, wherein modifying the first document further comprises removing from the first document at least one of JavaScript, cascading style sheet (CSS), an element sought to be removed, or part of the element sought to be removed.

3. The computer implemented method of claim 1, wherein the query is formatted as natural language.

4. The computer implemented method of claim 1, wherein the generated expression comprises an XPath, a cascading style sheet (CSS) selector, or a regular expression.

5. The computer implemented method of claim 1, wherein the generated expression is a second expression, and wherein (e) further comprises:
   generating a first expression defining a path to the element in the modified first document by referencing the index value; and
   generating the second expression by referencing the element parsed from the modified first document using the first expression, wherein the second expression is configured to parse the element in the second document.

6. The computer implemented method of claim 1, further comprising:
   determining a type of the parsed data of the second element matches a type of the element in the first document; and
   storing the parsed data and the expression, in association with the second document.

7. The computer implemented method of claim 1, further comprising:
   determining a type of the parsed data of the second element is different from a type of the element in the first document;
   generating a second expression configured to access the element by repeating steps (c)-(f) for the second document; and
   parsing, from the second document, second data of the second element using the second expression.

8. A system for parsing a document formatted using a markup language, the document including a plurality of elements each separated using a tag, the system comprising:
   a memory; and
   at least one processor coupled to the memory and configured to:
   (a) receive a request to identify an element sought to be parsed in a first document accessible at a target web page;
   (b) download the first document from a uniform resource locator (URL) at the target web page;
   (c) for respective elements in the plurality of elements, modify the first document by adding an index value as an attribute to the tag for the respective element;
   (d) submit, to a large language model, a query comprising the modified first document, a description of the element sought to be parsed from the plurality of elements, and a request asking the large language model to identify the element sought to be parsed based on the description;
   (e) obtain, from the large language model, the index value assigned to the element sought to be parsed;
   (f) generate an expression defining a path to the element in the first document that was assigned to the index value returned by the large language model;
   (g) download a second document from the URL at the target web page; and
   (h) parse, from the second document, data of a second element using the expression.

9. The system of claim 8, wherein to modify the first document, the at least one processor is further configured to remove from the first document at least one of JavaScript, cascading style sheet (CSS), an element sought to be removed, or part of the element sought to be removed.

10. The system of claim 8, wherein the query is formatted as natural language.

11. The system of claim 8, wherein the generated expression comprises an XPath, a cascading style sheet (CSS) selector, or a regular expression.

12. The system of claim 8, wherein the generated expression is a second expression, and wherein the at least one processor is further configured to:
   generate a first expression defining a path to the element in the modified first document by referencing the index value; and
   generate the second expression by referencing the element parsed from the modified first document using the first expression, wherein the second expression is configured to parse the element in the second document.

13. The system of claim 8, wherein the at least one processor is configured:
   determine a type of the parsed data of the second element matches a type of the element in the first document; and
   store the parsed data and the expression, in association with the second document.

14. The system of claim 8, wherein the at least one processor is configured:
   determine a type of the parsed data of the second element is different from a type of the element in the first document;
   generate a second expression configured to access the element by repeating steps (c)-(f) for the second document; and
   parse, from the second document, second data of the second element using the second expression.

15. A non-transitory computer-readable device having instructions stored thereon that, when executed by at least one computing device, cause the at least one computing device to perform operations comprising:
   (a) receiving a request to identify an element sought to be parsed in a first document accessible at a target web page;
   (b) downloading the first document from a uniform resource locator (URL) at the target web page;
   (c) for respective elements in a plurality of elements, modifying the first document by adding an index value as an attribute to a tag for the respective element;
   (d) submitting, to a large language model, a query comprising the modified first document, a description of the element sought to be parsed from the plurality of elements, and a request asking the large language model to identify the element sought to be parsed based on the description;
   (e) obtaining, from the large language model, the index value assigned to the element sought to be parsed;
   (f) generating an expression defining a path to the element in the first document that was assigned to the index value returned by the large language model;
   (g) downloading a second document from the URL at the target web page; and
   (h) parsing, from the second document, data of a second element using the expression.

16. The non-transitory computer-readable device of claim 15, wherein to modify the first document, the operations further comprise removing from the first document at least one of JavaScript, cascading style sheet (CSS), an element sought to be removed, or part of the element sought to be removed.

17. The non-transitory computer-readable device of claim 15, wherein the generated expression comprises an XPath, a cascading style sheet (CSS) selector, or a regular expression.

18. The non-transitory computer-readable device of claim 15, wherein the generated expression is a second expression, and wherein (e) further comprises:
   generating a first expression defining a path to the element in the modified first document by referencing the index value; and
   generating the second expression by referencing the element parsed from the modified first document using the first expression, wherein the second expression is configured to parse the element in the second document.

19. The non-transitory computer-readable device of claim 15, wherein the operations further comprise:
   determining a type of the parsed data of the second element matches a type of the element in the first document; and
   storing the parsed data and the expression, in association with the second document.

20. The non-transitory computer-readable device of claim 15, wherein the operations further comprise:
   determining a type of the parsed data of the second element is different from a type of element in the first document;
   generating a second expression configured to access the element by repeating steps (c)-(f) for the second document; and
   parsing, from the second document, second data of the second element using the second expression.

* * * * *